United States Patent Office 3,001,987
Patented Sept. 26, 1961

3,001,987
17-SUBSTITUTED 18-HYDROXY-3,5-CYCLOAN-
DROSTAN-6-ONES, DERIVATIVES THERE-
OF, AND INTERMEDIATES THERETO
Raphael Pappo, Skokie, Ill., assignor to G. D. Searle
& Co., Chicago, Ill., a corporation of Delaware
No Drawing. Filed July 11, 1960, Ser. No. 41,733
6 Claims. (Cl. 260—239.55)

The present invention relates to novel steroids characterized by an 18-oxygenated function and also by a 3,5-cycloandrostane ring structure. More particularly, they are 17-substituted 18-hydroxy-3,5-cycloandrostan-6-ones, derivatives thereof, and intermediates thereto, as represented by the structural formulae

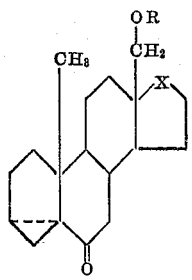

and

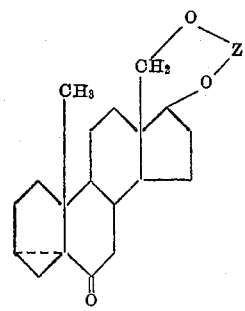

wherein X is a member of the class comprising carbonyl, β-hydroxymethylene, β-(lower alkanoyl)oxymethylene, and halomethylene radicals; R is hydrogen or a lower alkanoyl radical; and Z is a (trifluoroacetyl)vinyl:

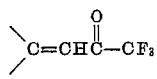

or a trifluoroacetylmethyl-hydroxymethylene:

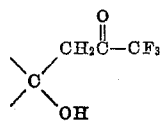

radical.

Lower alkanoyl radicals encompassed by the R and X terms are, typically, formyl, acetyl, propionyl, butyryl, valeryl, caproyl, and the branched-chain isomers thereof.

The halogen atoms represented by Y are fluorine, chlorine, bromine, and iodine.

A starting material suitable for the manufacture of the compounds of this invention is 18,20-epoxy-3,5-cyclopregn-20-en-6-one. Peroxidation of the latter substance, suitably with hydrogen peroxide in the presence of an acidic catalyst such as p-toluenesulfonic acid, results in 18,20-epoxy-3,5-cyclopregnan-6-one hydroperoxide. This hydroperoxide, upon treatment with methanesulfonyl chloride in pyridine, affords a mixture which can be separated chromatographically into its pure components, 18-acetoxy-17α-chloro-3,5-cycloandrostan-6-one and 18-acetoxy-17β-hydroxy-3,5-cycloandrostan-6-one. As an alternate route to the latter 17β-hydroxy-18-acetate, the aforementioned hydroperoxide is allowed to react with excess trifluoroacetic anhydride in the presence of a basic catalyst such as triethylamine to yield 6-oxo-3,5-cycloandrostan-17β,18-yl trifluoroacetylketene acetal. Hydrolysis of this acetal, suitably with dilute aqueous perchloric acid in a water-miscible solvent such as acetone or tertiary-butyl alcohol, affords 17β,18-dihydroxy-3,5-cycloandrostan-6-one 18-trifluoroacetoacetate, which is shown in the following representation in equilibruim with its tautomers:

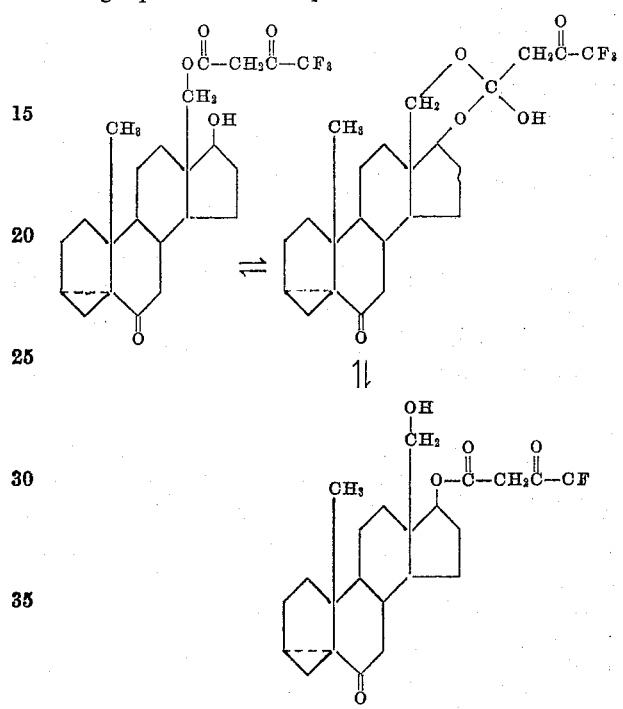

Acid hydrolysis of this trifluoroacetoacetate, suitably with dilute hydrochloric acid in aqueous dioxane, provides the aforementioned 18-acetoxy-17β-hydroxy-3,5-cycloandrostan-6-one, whereas alkaline hydrolysis, as exemplified by heating with dilute sodium hydroxide, results in the instant 17β,18-dihydroxy-3,5-cycloandrostan-6-one. This diol is obtained also by alkaline hydrolysis of the aforementioned 18-acetoxy-17β-hydroxy-3,5-cycloandrostan-6-one, as for example by means of aqueous sodium hydroxide in ethanol.

Treatment of the aforementioned 17β,18-dihydroxy-3,5-cycloandrostan-6-one with a limited quantity of a lower alkanoic acid anhydride in pyridine produces the instant 18-mono-(lower alkanoates), whereas reaction of that diol with an excess of a lower alkanoic acid anhydride in the presence of a suitable acid acceptor results in the 17β,18-di-(lower alkanoates) of this invention. Thus, this diol affords 17β-hydroxy-18-propionoxy-3,5-cycloandrostan-6-one and 17β,18-diacetoxy-3,5-cycloandrostan-6-one, respectively, upon treatment with one molecular equivalent of propionic anhydride in pyridine or excess acetic anhydride in pyridine. Partial hydrolysis of the instant di-(lower alkanoates), typically with aqueous sodium hydroxide, yields the 17β-mono-(lower alkanoates) of this invention. As a specific example, 17β,18-diacetoxy-3,5-cycloandrostan-6-one is allowed to react with aqueous sodium hydroxide to yield 17β-acetoxy-18-hydroxy-3,5-cycloandrostan-6-one.

The instant 18-(lower alkanoyl)oxy-6,17-diones are obtained by oxidation of the corresponding 17β-ol, as exemplified by the reaction of 18-acetoxy-17β-hydroxy-3,5-cycloandrostan-6-one in acetone with aqueous chromic acid to produce 18-acetoxy-3,5-cycloandrostane-6,17-dione. Hydrolysis of these 18-mono-(lower alkanoyl)oxy-6,17-diones with aqueous acid results in the instant 18-hydroxy-3,5-cycloandrostane-6,17-dione.

Treatment of the aforementioned 18-acetoxy-17α-chloro-3,5-cycloandrostan-6-one with aqueous sodium hydroxide produces the instant 17α-chloro-18-hydroxy-3,5-cycloandrostan-6-one, which yields the 17α-chloro-18-(lower alkanoyl)oxy-3,5-cycloandrostan-6-ones of this invention upon treatment with the appropriate lower alkanoic acid anhydride in pyridine. As an example of the latter process, the 17α,18-chlorohydrin is allowed to react with propionic anhydride and pyridine to afford 17α-chloro-18-propionoxy-3,5-cycloandrostan-6-one.

The 17β-chloro, 17α-bromo, 17β-bromo, 17α-iodo, and 17β-iodo compounds of this invention are obtained by treating the corresponding 17α-chloro compound with lithium chloride, lithium bromide, or lithium iodide, respectively. The instant 17α-fluoro and 17β-fluoro derivatives result from the treatment of the appropriate 17α-chloro compound with silver fluoride.

The compounds of the present invention are useful as result of their valuable pharmacological properties. They are anti-hormonal agents, for example, in consequence of their ability to inhibit the sodium-retaining activity of desoxycorticosterone acetate.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (°C.). Quantities of materials are expressed in parts by weight unless otherwise noted.

*Example 1*

To a solution of 7 parts of 90% hydrogen peroxide in 105 parts of ether is added successively, at 0–5°, 0.09 part of p-toluenesulfonic acid monohydrate and a solution of 4.52 parts of 18,20-epoxy-3,5-cyclopregn-20-en-6-one in 18 parts of benzene. The reaction mixture is stirred at room temperature for about one hour, then diluted with benzene, and the resulting mixture is washed successively with aqueous potassium bicarbonate and water, then dried over anhydrous sodium sulfate. This benzene solution is concentrated to dryness to afford 18,20-epoxy-3,5-cyclopregnan-6-one hydroperoxide, which possesses infrared absorption maxima at 3.0, 3.41, 3.5, 5.9, 9.73, and 11.54 microns.

*Example 2*

To a solution of 5.92 parts of methanesulfonyl chloride in 50 parts of dry pyridine is added dropwise, at 0–5° over a period of about 5 minutes, a solution of 4.6 parts of 18,20-epoxy-3,5-cyclopregnan-6-one 20-hydroperoxide in 20 parts of benzene. This reaction mixture is allowed to stand at 5° for about 5 hours, then cooled in an ice bath while 10 parts of water are added. The resulting heterogeneous mixture is stirred at room temperature for about one hour, then extracted with benzene. The organic extract is washed successively, at about 5°, with dilute hydrochloric acid, water, dilute aqueous sodium hydroxide, and water; dried over anhydrous sodium sulfate, and concentrated to dryness in vacuo. The residual gum is dissolved in benzene and adsorbed on silica gel. The column is eluted with benzene containing increasing concentrations of ether. Elution with 5% ether in benzene, evaporation of the eluate to dryness, and recrystallization from ether results in pure 18-acetoxy-17α-chloro-3,5-cycloandrostan-6-one, M.P. 121–123°.

The 50% ether in benzene eluate and pure ether eluate are combined, concentrated to dryness, and the residue is triturated with ether to produce 18-acetoxy-17β-hydroxy-3,5-cycloandrostan-6-one, M.P. 142–144°.

*Example 3*

To a solution of 2 parts of 18-acetoxy-17β-hydroxy-3,5-cycloandrostan-6-one in 16 parts of ethanol is added 10 parts of 10% aqueous sodium hydroxide, and the resulting solution is allowed to stand at room temperature for about 16 hours. Dilution of the reaction mixture with water results in crystallization of the product, which is isolated by centrifugation. Recrystallization from benzene produces pure 17β,18-dihydroxy-3,5-cycloandrostan-6-one, M.P. 174–175°.

*Example 4*

To a mixture of 9 parts of 17β,18-dihydroxy-3,5-cycloandrostan-6-one and 90 parts of pyridine is added 3.9 parts of propionic anhydride, and the resulting mixture is warmed on a steam bath to achieve solution, then stored at room temperature for about 16 hours. The reaction mixture is poured slowly, with stirring, into ice and water. This aqueous mixture is extracted with benzene and the organic layer is washed successively with dilute hydrochloric acid and water, dried over anhydrous sodium sulfate, and evaporated to dryness at reduced pressure. Adsorption of the residue on silica gel followed by elution with 50% ether in benzene produces 17β-hydroxy-18-propionoxy-3,5-cycloandrostan-6-one.

*Example 5*

A solution of 9.8 parts of 18-acetoxy-17β-hydroxy-3,5-cycloandrostan-6-one in 240 parts of acetone is treated dropwise with 9.5 parts by volume of an aqueous solution, 8 N in chromium trioxide and 8 N in sulfuric acid, and this reaction mixture is stirred at room temperature for about 5 minutes longer. The excess oxidizing agent is destroyed by addition of isopropanol, and the resulting mixture is concentrated to dryness in vacuo, under nitrogen. The residue is treated with ether and water, and the organic layer is separated, washed successively with aqueous potassium bicarbonate and water, dried over anhydrous sodium sulfate, and concentrated to afford crystals of 18-acetoxy-3,5-cycloandrosane-6,17-dione, M.P. 188–191°.

The substitution of an equivalent quantity of 17β-hydroxy-18-propionoxy-3,5-cycloandrostan-6-one in the process of this example results in 18-propionoxy-3,5-cycloandrostane-6,17-dione.

*Example 6*

To a solution of 2.4 parts of 18-acetoxy-3,5-cycloandrostane-6,17-dione in 200 parts of dioxane is added 2.5 parts of p-toluenesulfonic acid monohydrate and 100 parts of water, and the resulting mixture is stored at room temperature for about 4 days. Aqueous potassium bicarbonate is added to pH 7–7.5, the solvent evaporated at reduced pressure, and the residue is taken up in benzene. The organic solution is washed successively with aqueous potassium bicarbonate and water, dried over anhydrous sodium sulfate, and evaporated to dryness in vacuo to afford 18-hydroxy-3,5-cycloandrostane-6,17-dione.

*Example 7*

A solution containing 2 parts of 17β,18-dihydroxy-3,5-cycloandrostan-6-one, 20 parts of acetic anhydride, and 20 parts of pyridine is stored at room temperature for about 16 hours. The reaction mixture is poured into water, then extracted with benzene. The organic solution is washed successively with dilute hydrochloric acid and water, dried over anhydrous sodium sulfate, and concentrated to dryness in vacuo to afford 17β,18-diacetoxy-3,5-cycloandrostan-6-one.

By substituting an equivalent quantity of propionic anhydride and otherwise proceeding according to the herein-described processes, 17β,18 - dipropionoxy - 3,5-cycloandrostan-6-one is obtained.

Example 8

A mixture of 5 parts of 17β,18-diacetoxy-3,5-cycloandrostan-6-one, 0.5 part of sodium hydroxide, 400 parts of water is stored at room temperature for about 16 hours, then extracted with benzene. The benzene solution is washed with water, dried over anhydrous sodium sulfate, and evaporated to dryness at reduced pressure. The residue is adsorbed on silica gel and eluted with increasing concentrations of ether in benzene. The 50% ether in benzene eluate affords 17β-acetoxy-18-hydroxy-3,5-cycloandrostan-6-one.

By substituting an equivalent quantity of 17β,18-dipropionoxy - 3,5 - cycloandrostan - 6 - one in the herein-described process, 18-hydroxy-17β-propionoxy-3,5-cycloandrostan-6-one is obtained.

Example 9

To a solution of one part of 18-acetoxy-17α-chloro-3,5-cycloandrostan-6-one in 100 parts of methanol is added 0.15 part of sodium hydroxide in 5 parts of water, and the resulting mixture is stored at room temperature for about 4 days. This mixture is concentrated, and the residue is extracted with benzene. The organic extract is washed successively with aqueous potassium bicarbonate and water, then dried over anhydrous sodium sulfate. Evaporation of the solvent affords 17α-chloro-18-hydroxy-3,5-cycloandrostan-6-one.

Example 10

A mixture of 2 parts of 17α-chloro-18-hydroxy-3,5-cycloandrostan-6-one, 25 parts of propionic anhydride, and 40 parts of pyridine is stored at room temperature for about 15 hours. The reaction mixture is diluted with water, then the product extracted into benzene. Successive washings of the extract with dilute hydrochloric acid and water, followed by evaporation of the solvent results in 17α-chloro-18-propionoxy-3,5-cycloandrostan-6-one.

What is claimed is:
1. A compound of the structural formula

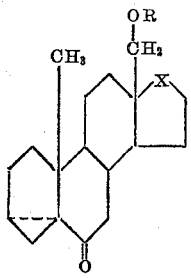

wherein X is selected from the group consisting of carbonyl, β - hydroxymethylene, β - (lower alkenoyl)oxymethylene, and α-chloromethylene radicals; and R is selected from the group consisting of hydrogen and lower alkanoyl radicals.

2. 18-acetoxy-17β-hydroxy-3,5-cycloandrostan-6-one.
3. 18-acetoxy-3,5-cycloandrostane-6,17-dione.
4. 17β,18-dihydroxy-3,5-cycloandrostan-6-one.
5. 18-acetoxy-17α-chloro-3,5-cycloandrostan-6-one.
6. 18,20-epoxy-3,5-cyclopregnan-6-one 20-hydroperoxide.

No references cited.